June 4, 1968  F. C. HITZEROTH ET AL  3,386,127
CONTROL KNOB CONNECTING MEANS
Filed Oct. 22, 1965  2 Sheets-Sheet 1
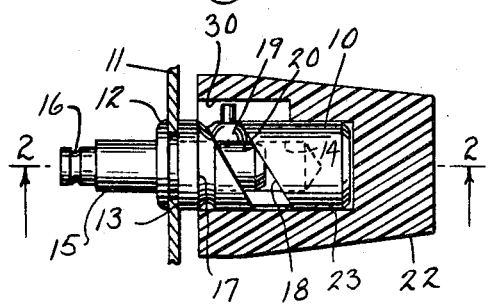
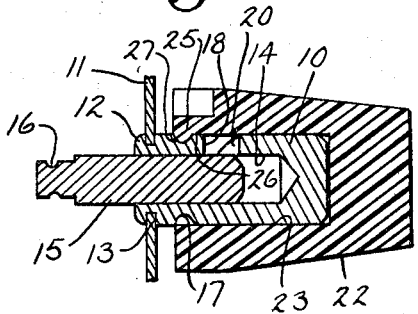
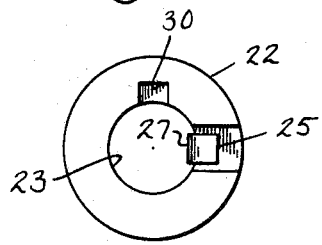
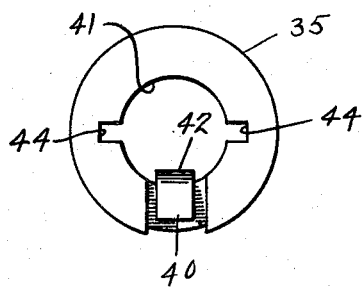
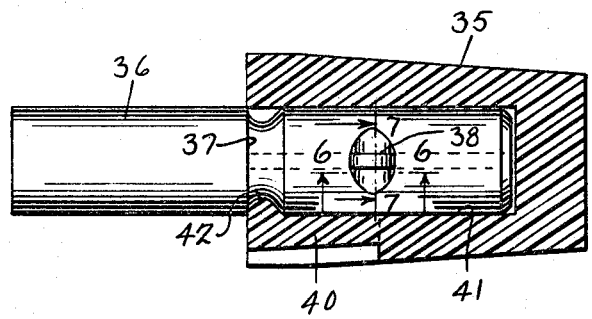
INVENTOR
FRANKLIN C. HITZEROTH
DAVID B. WALITZER
BY
ATTORNEY

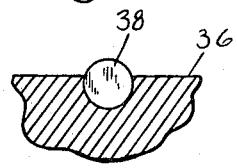
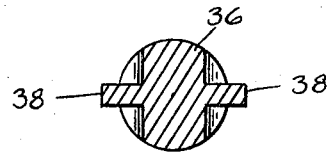
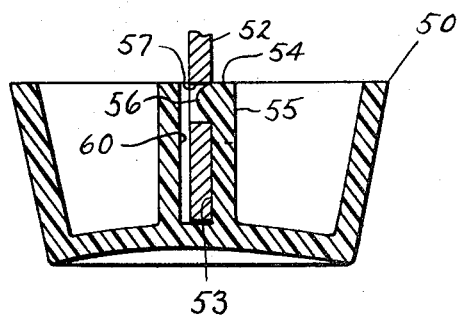
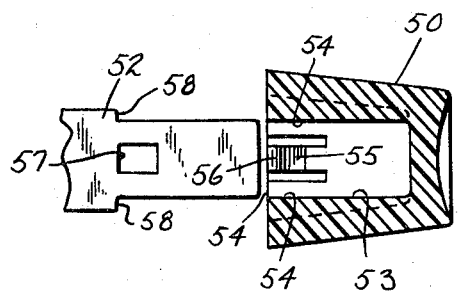
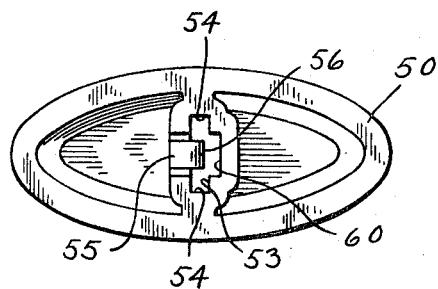

United States Patent Office 3,386,127
Patented June 4, 1968

3,386,127
CONTROL KNOB CONNECTING MEANS
Franklin C. Hitzeroth, Elgin, and David B. Walitzer, Algonquin, Ill., assignors to McGraw-Edison Company, Milwaukee, Wis., a corporation of Delaware
Filed Oct. 22, 1965, Ser. No. 501,045
2 Claims. (Cl. 16—121)

ABSTRACT OF THE DISCLOSURE

A control knob connection for reciprocably and rotatably moving a member supported within a bearing, including trapping a protuberance integral with the member within a curved slot in the bearing and an axial slot within a handle portion fit rotatably over the bearing, and rotatably securing the handle on the bearing by a resilient arm integral at one end with the handle and presenting a projection at its opposite end that fits within a circumferential recess on the bearing

---

This invention relates to an improved means for securing a control knob or handle to a projecting member.

In the present invention a control knob is releasably secured to a projecting member without the use of additional parts, with assembly and disassembly accomplished by applying a force axially with respect to the knob or handle either to engage the cooperating detent structures or terminate the securing cooperation of the detent structures. This structure eliminates the use of set screws, E-rings or other commonly accepted fastening devices which require the use of additional parts and more assembly procedures. This is accomplished by forming a knob or handle of resilient material with a recess defined therein for receiving the projecting member. A cantilevered portion formed as an integral part of the control knob or handle extends longitudinally along the recess with a cooperating detent portion formed as a part of the distal end of the cantilevered portion. The knob or handle can then be axially forced to move the detent formed on the cantilevered portion into or out of cooperating engagement with a cooperating detent structure formed as a part of the projecting member.

It is an object of this invention to provide a simplified means for releasably securing a knob or handle to a projecting member.

It is a further object of this invention to provide a structure for interconnecting a knob or handle to a projecting member without the use of additional parts.

These and other objects and advantages of this invention will become apparent from the following description taken in connection with the accompanying drawings, wherein:

FIGURE 1 is a longitudinal vertical section of a control knob incorporating the present invention and including mechanism to translate rotary motion of the control knob into reciprocating motion of the controlled member;

FIGURE 2 is a longitudinal section of the control knob of FIGURE 1 taken along the line 2—2 of FIGURE 1;

FIGURE 3 is an axial end view of the control knob portion of FIGURES 1 and 2 as seen from the left side of FIGURE 1;

FIGURE 4 is a second embodiment showing a control knob in longitudinal section which is designed to rotate in unison with a projecting member;

FIGURE 5 is an axial end view of the control knob of FIGURE 4 as viewed from the left side as shown in FIGURE 4;

FIGURE 6 is a plan view of the portion of the projecting member taken along line 6—6 of FIGURE 4;

FIGURE 7 is a vertical section of the projecting member of FIGURE 4;

FIGURE 8 is a horizontal section of a third embodiment showing a handle secured to a projecting member of rectangular section; and FIGURE 9 is a vertical section of the handle and projecting member of FIGURE 8 with the parts disconnected from one another; and FIGURE 10 is a rear axial end view of the handle of FIGURE 8.

Referring to FIGURES 1 through 3 a projecting member 10 extends through an aperture in a wall and is secured to the wall by an axial end portion which is upset to form a flange 12 with the wall 11 held captive between flange 12 and the shoulder 13. A cylindrical axial recess 14 is formed in the projecting member 10 in which is received the cylindrical end portion of an actuating member 15 which has at one distal end an annular groove 16 formed therein for connection to other apparatus. The projecting member has a groove 17 formed in the outer periphery and a groove 18 in the form of a modified helix The groove 18 is formed prior to assembly of the projecting member to the wall by milling a rectangular channel through the projecting member 10 which intersects the axis of the projecting member at an angle. Rigidly affixed to the actuating member is a trunnion which has a spherical portion 19 that projects into and is engageable with the sidewalls 20 of the groove 18 and a cylindrical projecting portion 21 that extends beyond the peripheral surface of the projecting member 10. The control knob 22 is molded of a resilient material with a cylindrical depression 23 therein that is slidably received about the peripheral surface of the projecting member 10. Within a recess at one axial end of the control knob 22 is a cantilevered member 25 formed as a part of the knob with a surface 26 substantially coextensive with a cylindrical depression 23 and a projection 27 formed at the distal end which projects into the projecting member groove 17 to releasably retain the knob with respect to the projecting member. To effect assembly of the control knob 22 to the projecting member 19 an axial force is applied to the knob sufficient to cause the cantilevered axially projecting arm 25 to spring or deflect away from the projecting member 10 until the projection 27, which acts as a detent, engages the annular groove 17. The knob is then rotatably positioned about the projecting member 10 and may be readily pivoted with respect thereto. An axial groove 30 is provided which extends from the cylindrical depression in the control knob and in this is received the terminal portion 21 of the projecting trunnion affixed to the actuating member so that rotation of the control knob 22 will cause rotation of the actuating member 15 by engagement between the projection 21 and an axial surface of the control knob groove 30. Accordingly, the actuating member 15 will pivot in unison with the control knob 22 and progress axially with respect to the control knob and the projecting member 10 as the spherical portion of the projection 19 extending from the actuating member engages the sidewalls 20 of the projecting member groove 18.

FIGURES 4 and 5 illustrate an alternative form of the invention wherein a control knob 35 is secured to a projecting member 36 with a driving connection therebetween so that the two parts are pivoted in unison. The projecting member 36 has an annular groove 37 and a pair of swaged ears 38. The ears 38, which cooperate to provide a driving engagement between the knob 35 and the projecting member 36, are shown in greater detail in FIGURES 6 and 7 where it can be seen that circular members are forced against a portion of the peripheral surface to form substantially semi-circular projections by upsetting the metal between the two tool portions. The knob 35 is formed of a resilient plastic material with a notched portion in which a cantilevered element 40 integrally formed with the knob extends along the cylindrical recess 41 in which is received the major surface of the projecting member 36. At the distal end a projection 42 extends toward the axis of the recess 41 from the cantilevered projecting element 40. A pair of longitudinal grooves 44 are formed in the knob and extend from the cylindrical recess 41 at diametrically opposite sides and are angularly spaced from the cantilevered element 40. The knob 35 is assembled to the projecting shaft member 36 by applying to the knob a sufficient axial force with the grooves 44 aligned with the ears 38 on the projecting member to cause the cantilevered projecting element to deflect away from the axis sufficiently to permit the knob to slide over the end of the projecting element to a point where the cantilevered member projection 42 is received in the annular recess 37. The knob may be withdrawn by a sufficient axial force in the opposite direction to deflect the cantilevered projecting member 40 sufficiently to permit the projection 42 to ride over the peripheral surface of the projecting member 36. The ears 38 cooperate with the slots 44 in the knob to provide a driving connection between the knob and the projecting member.

FIGURES 8, 9, and 10 show a second alternate form of this invention as applied to a handle 50 mounted on a projecting member 52 of rectangular cross section. The handle 50 includes internal recess 53, defined by longitudinally extending confronting U-shaped surfaces 54, extending from the rear handle surface 54 at the top of the figure as seen in FIGURE 8. Along one longitudinal side of the recess 53 is a cantilevered portion 55 with a projection 56 extending into the recess at the distal end. The knob 50 is assembled to the projecting member 52 by an axial force which causes the cantilevered portion 55 to deflect away from the recess 53 permitting the projection 56 to ride over the projecting member surface to a position where the projection is received in the projecting member aperture 57. When the control knob projection 56 is positioned in the aperture 57 the surface 54 of the knob abuts the shoulders 58 of the projecting member 52 to add further stability to the interconnection between knob and projecting member.

The control knobs are formed by molding a plastic material with a mold core portion that forms the recess in which the projecting member is received and the projection on the cantilevered element being separated from the molded part after the knob or handle has been otherwise freed from the mold to permit the deflection of the cantilevered element as the knob is stripped from mold core portion. As will be noted in FIGURES 8 and 10, an additional recessed portion 60 is provided in confronting relation to the contilevered member and the projecting portion thereof which provides added strength to the core portion which forms the recess of this handle and improves the life of the tool used to fabricate or mold the handle.

While specific embodiments of the instant invention have been shown and described herein it is to be understood that variations may be made without departing from the spirit and scope of the invention as defined in the appended claims.

What is claimed is:

1. In combination, a frame; a bearing supported within the frame; a member mounted to reciprocate and to rotate within the bearing; a protuberance on the member extending transversely into and being laterally confined within a slot formed spirally within the bearing, the end of the protuberance extending beyond the outer surface of the bearing; a handle adapted to fit over the bearing for rotation on the outer surface and having an axial slot disposed to receive and confine the protuberance whereby rotation of the handle simultaneously rotates and reciprocates the member within the bearing; said handle including a relieved area, and an axially extending arm formed within the relieved area and being integral at one end with the handle and having a projection at its opposite end and directed inwardly to engage the member, said projection being adapted to fit and be confined within a circumferential recess formed on the outer surface of the bearing when the handle is properly positioned axially of the bearing and the handle being formed of a resilient material so that it can be moved axially of the bearing only upon outward deflection of the arm to provide that after the projection rides over the outer surface of the bearing and is received within the circumferential recess, the handle is axially secured and rotatably mounted on the bearing.

2. In combination, a frame; a bearing supported within the frame; a member mounted to rotate within the bearing; a handle adapted to fit over the bearing for rotation on the outer surface; means connecting the member to the handle whereby rotation of the handle simultaneously rotates the member within the bearing; said handle including a relieved area, and an axially extending arm formed within the relieved area and being integral at one end with the handle and having a projection at its opposite end directed inwardly to engage the member, said projection being adapted to fit and be axially confined within a circumferential recess formed on the outer surface of the bearing when the handle is properly positioned axially of the bearing, and the handle being formed of a resilient material so that it can be moved axially of the bearing only upon outward deflection of the arm to permit the projection to ride over the outer surface of the bearing and be received within the circumferential recess, and whereat the handle is axially secured to but can be rotated on the bearing.

References Cited

UNITED STATES PATENTS

| | | | |
|---|---|---|---|
| 2,171,361 | 8/1939 | Gits et al. | 16—121 |
| 2,869,099 | 1/1959 | Robinson. | |
| 2,902,738 | 9/1959 | Owens | 24—217 |

BOBBY R. GAY, *Primary Examiner.*

D. L. TROUTMAN, *Assistant Examiner.*